United States Patent
Alhammadi et al.

(10) Patent No.: US 10,759,237 B2
(45) Date of Patent: Sep. 1, 2020

(54) SUSTAINABLE AND INTEGRATED SYSTEM FOR COOLING VEHICLE TIRES EXTERNALLY

(71) Applicant: UNITED ARAB EMIRATES UNIVERSITY, Al Ain (AE)

(72) Inventors: Mariam Abdulrazzaq Abdullah Alhammadi, Al Ain (AE); Waleed Khalil Ahmed, Al Ain (AE)

(73) Assignee: United Arab Emirates University, Al-Ain (AE)

( * ) Notice: Subject to any disclaimer, the term of this patent is extended or adjusted under 35 U.S.C. 154(b) by 172 days.

(21) Appl. No.: 16/057,761

(22) Filed: Aug. 7, 2018

(65) Prior Publication Data
US 2020/0047568 A1  Feb. 13, 2020

(51) Int. Cl.
*B60C 23/18* (2006.01)
*B60H 1/32* (2006.01)

(52) U.S. Cl.
CPC ........... *B60C 23/18* (2013.01); *B60H 1/3233* (2013.01)

(58) Field of Classification Search
CPC .... B60C 23/18; B60H 1/3233; B60H 1/32331
See application file for complete search history.

(56) References Cited

U.S. PATENT DOCUMENTS

| | | | |
|---|---|---|---|
| 3,256,920 A * | 6/1966 | Byers | B60B 39/00 152/208 |
| 4,343,338 A | 8/1982 | Hart | |
| 4,771,822 A * | 9/1988 | Barbosa | B60C 23/18 165/41 |
| 2014/0183879 A1 | 7/2014 | Piroozmandi et al. | |
| 2017/0267291 A1* | 9/2017 | Granen Roca | B60R 99/00 |
| 2019/0301779 A1* | 10/2019 | Shan | B60H 1/3227 |

FOREIGN PATENT DOCUMENTS

| | | | |
|---|---|---|---|
| CN | 201254087 Y | 8/2009 | |
| CN | 201685663 U | 12/2010 | |
| CN | 107539044 A | 1/2018 | |
| GB | 2533470 A * | 6/2016 | ............ B60C 23/20 |
| GB | 2533470 A | 6/2016 | |
| JP | 8-67118 A | 3/1996 | |
| JP | 2006-193058 A | 7/2006 | |

OTHER PUBLICATIONS

Azman et al., "Increasing the Tire Life Span by Means of Water Cooling," International Journal of Mining, Metallurgy & Mechanical Engineering, vol. 1, Issue 1, 2013.

* cited by examiner

*Primary Examiner* — Ana M Vazquez
(74) *Attorney, Agent, or Firm* — Richard C. Litman; Nath, Goldberg & Meyer

(57) ABSTRACT

A tire cooling system can be installed in a vehicle to receive condensate from evaporator of the vehicle and use the condensate for cooling one or more tires of the vehicle. The system includes a drain line, a collection reservoir, a pump, at least one spray assembly configured for positioning proximate a vehicle tire, a valve, water level sensors, a tire temperature sensor, and a controller. The at least one spray assembly includes at least one nozzle attached to a manifold. A filter is disposed within the drain line for filtering condensate that is directed to the reservoir from the evaporator.

8 Claims, 1 Drawing Sheet

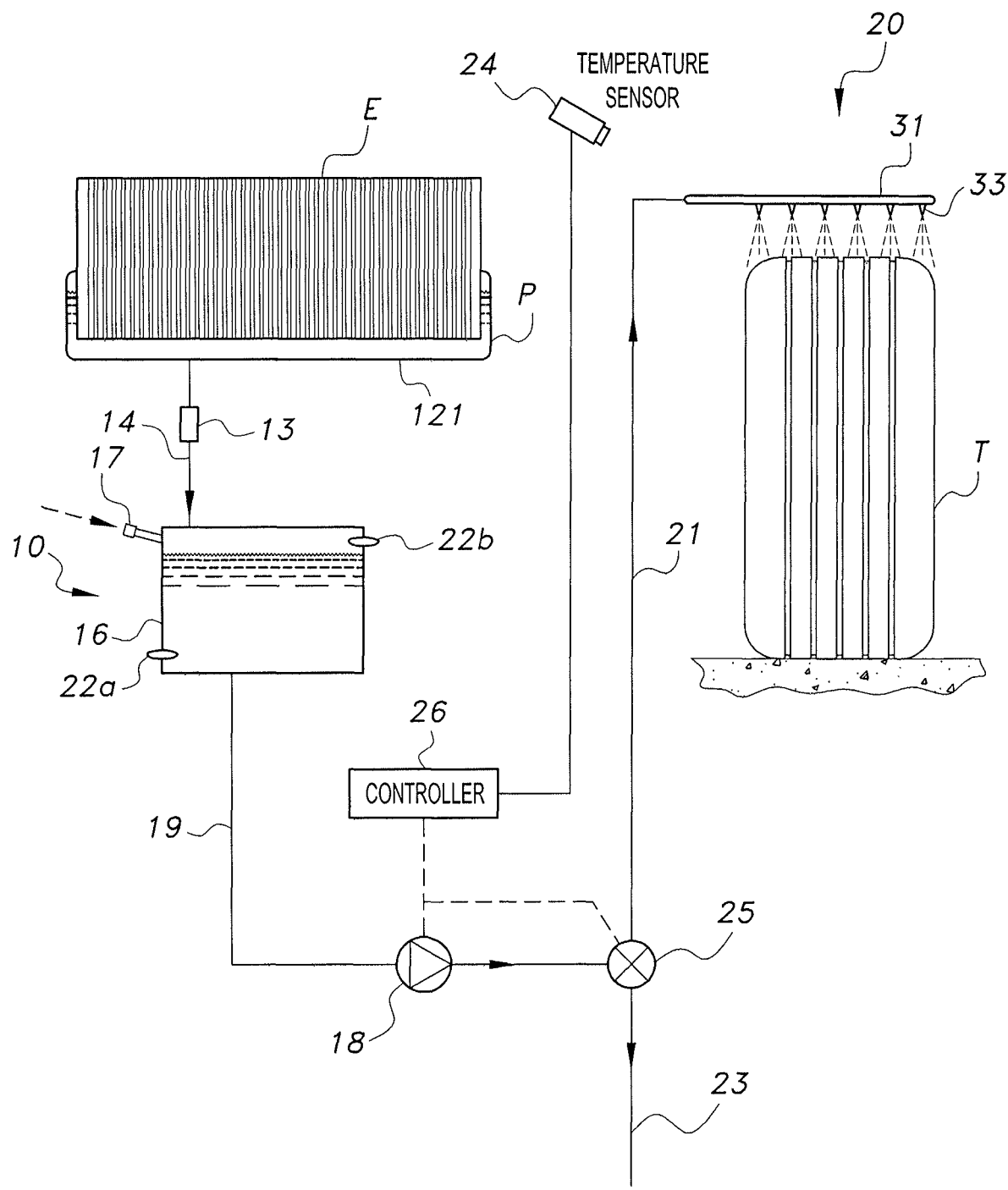

SUSTAINABLE AND INTEGRATED SYSTEM FOR COOLING VEHICLE TIRES EXTERNALLY

BACKGROUND

1. Field

The present disclosure is related to a water cooling system for car tires.

2. Description of the Related Art

Tire temperature generally rises beyond acceptable levels at hot ambient temperatures and during sustained high speed driving. Tire cooling systems are generally provided to spray tires with cooling liquid to reduce tire temperature and ultimately increase the life of the tire. Conventional tire cooling systems, however, require filling a tank manually with cooling fluid from an outside source.

Thus, a more efficient tire cooling system solving the aforementioned problems is desired.

SUMMARY

A tire cooling system can be installed in a vehicle to receive condensate from the evaporator of the vehicle and use the condensate for cooling one or more tires of the vehicle. The system includes a drain line, a collection reservoir, a pump, at least one spray assembly configured for positioning proximate a vehicle tire, a valve, water level sensors, a tire temperature sensor, and a controller. The at least one spray assembly includes at least one nozzle attached to a manifold. A filter is disposed within the drain line for filtering condensate that is directed to the reservoir from the evaporator.

A method for cooling tires can include collecting liquid from the evaporator of a vehicle in a storage reservoir, monitoring a water level in the storage reservoir using at least one water level sensor, selecting one or more spray assemblies through which to dispense the liquid collected in the storage reservoir based on the water level in the storage reservoir; transferring the liquid from the storage reservoir to the one or more selected spray assemblies; and dispensing the liquid to one or more of the vehicle tires through the one or more selected spray assemblies.

These and other features of the present disclosure will become readily apparent upon further review of the following specification and drawings.

BRIEF DESCRIPTION OF THE DRAWINGS

The sole drawing FIGURE is a schematic diagram of a tire cooling system according to the present teachings.

DETAILED DESCRIPTION OF THE PREFERRED EMBODIMENTS

As shown in the FIGURE, a tire cooling system 10 can be connected to an evaporator E in a vehicle for cooling one or more tires T of the vehicle. Vehicle air conditioning systems typically use the evaporator to cool cabin air. The cooling results in condensation. As such, the evaporator E typically has associated with it, a drain pan P with a drain line. The present system 10 can be installed in a vehicle to receive the condensate from the drain line and use the condensate for cooling one or more tires of the vehicle. The vehicle can be a car, truck, or other motor vehicle with tires.

The system 10 includes a first conduit or drain line 14, a collection reservoir 16, a pump 18, at least one spray assembly 20 configured for positioning proximate a vehicle tire T, a valve 25, water level sensors 22a, 22b, a tire temperature sensor 24, and a controller 26. The at least one spray assembly 20 includes at least one nozzle 33 attached to a manifold 31. A filter 13 is disposed within drain line 14 for filtering the condensate 16 that is directed to the reservoir 16. While one tire T is depicted, it should be understood that the system can be used to cool one or more tires T of the vehicle, preferably at a position subject to the most heating, as described herein.

The first conduit or drain line 14 captures condensate from the drain pan P and discharges the condensate to the reservoir 16. A second conduit 17 is provided for directing liquid to the reservoir 16 from alternative sources, e.g., water manually provided by a user, used windshield wiping liquid, rain water, and/or refrigerant. Thus, the reservoir 16 can be filled manually or automatically replenished with used liquid from the vehicle. Generally, evaporator condensate is quite plentiful for certain vehicles, e.g., a refrigerated truck.

A third conduit 19 extends between the reservoir 16 and the pump 18 to direct liquid discharged from the reservoir 16 to the pump 18. The valve 25 can receive the liquid dispensed from the pump and allow liquid to pass to or block liquid from passing to one or more spray assemblies 20 at the front of the vehicle through a first spray conduit 21 and/or one or more spray assemblies at the rear of the vehicle through a second spray conduit 23. Sensors 22a, 22b, connected to the reservoir 16, detect water and/or temperatures levels in the reservoir 16. The controller 26 receives the information detected by the sensors 22a, 22b and controls the operation of the various components, e.g., valve 25, as will be described in detail herein.

Sensors 22a, 22b provide indications of liquid level in reservoir 16. Temperature sensor 24 is used to sense tire temperature. While temperature sensor 24 is shown external to tire T, any convenient temperature sensing can be used. Additional sensors, e.g., a speed sensor (not shown) and ambient temperature sensors (not shown) can be provided if desired.

Preferably, the spray assembly 20 is positioned in front of the tire rather than over the tire so that water dispensed from each nozzle can contact the tire at an angle that is not perpendicular to the tire. In this manner, the water will be primarily directed to the ground contact point of the tire, which is generally the hottest point of the tire. Water contacting the tire at such an angle can be deflected off the tire and reach the ground rather than evaporate. Consequently, the water can cool the ground surface before the tire or other tires contact the ground. This is particularly desirable because the ground is the main source of heat transferred to the tire.

Each nozzle of the spray assembly can have a small diameter inlet and an outlet or output discharge area with a diameter smaller than the inlet to promote high speed and high pressure liquid discharge through the nozzle. Each nozzle can have one or more outlets. A nozzle with more than one outlet can be configured to provide multi-angle discharge of the liquid stream. Preferably, the liquid stream is provided to the nozzles intermittently in order to optimize water quantity consumption and to conserve energy for operating the pump.

The pump can be pressurized to direct the liquid to the nozzles. The pump can be operated using the vehicle's battery, solar panels, or mechanical energy. Mechanical energy can be generated from, for example, rotating parts of the engine or the driving shaft of the tire. In an embodiment, cold air can be drawn from within the vehicle and mixed with the water stream to provide a water/air mixture for cooling the tires. Such an embodiment can facilitate ventilation within the car.

In an embodiment, the output conduit from the water reservoir (conduit 19) can be wrapped around a cold pipe of the vehicle's AC compressor containing coolant gas. Such a configuration can reduce the temperature of the water directed to the spray assembly and increase cooling efficiency. The conduits of the system as well as the AC compressor pipe can be insulated to ensure cooling efficiency.

For embodiments having connections for cooling more than a single pair of tires, the controller 26 can determine which axle positions get cooled. For example, the controller can be configured to give priority to tires in the front of the engine as these tires heat up more quickly than rear tires. Thus, if liquid levels within the reservoir are low, the valve may permit liquid to pass to one or more front tires and block water from passing to one or more rear tires.

The system cools tires and, thereby, prevents heating of the tires beyond acceptable temperatures. According to the present teachings, condensate from a vehicle evaporator can be used to cool one or more tires of the vehicle. For example, the system can capture evaporator condensate from the evaporator of a vehicle's air conditioner and direct that liquid to one or more tires of the vehicle for cooling. Spraying nozzles/distributors dispense the liquid on the one or more tires. The system can cool tires in this manner while the vehicle is moving and/or while the vehicle is stationary. The system can use liquid previously used in the vehicle for other purposes to cool the tires. While water can be the cooling liquid used, other cooling liquids are also contemplated. For example, alcohol mixed with water can be manually provided through the second conduit to allow storing the cooling liquid in freezing conditions.

If a vehicle is travelling at a high speed, the tires of the vehicle will heat quickly. The sensor function provides an indication of the tires reaching temperatures which exceed their design limits. If the system is able to successfully cool the tires, then no further action is required from the driver; however, if the tires are not successfully cooled, the driver is able to compensate by driving slower, and thereby avoid overheating the tires. Further, to the extent that the system can be used to cool the tires, it avoids the need for the driver to stop the vehicle to all the tires to cool down.

The water level sensors monitor available water levels to facilitate control of the quantity and frequency of spraying and to determine whether all or some of the tires should be sprayed. The controller may be programmed to give priority to the tires at positions most likely to overheat (typically the front tires in a passenger car) at times when the water level in the reservoir is low.

The relative temperatures of the tires at different tire positions can be detected by the controller and assigned a ratio, or assumed based on a determination of axle loads to provide a front/rear ratio of axle weights. In addition to providing safety, tire cooling in this manner can increase the lifetime of the tires.

It is to be understood that the tire cooling system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A sustainable and integrated system for cooling vehicle tires, comprising:
    a collecting pan for collecting condensate from an evaporator of a vehicle;
    a liquid storage reservoir connected to the collecting pan by a first conduit;
    a pair of water level sensors disposed within the liquid storage reservoir, wherein one sensor is adjacent the top of the liquid storage reservoir and the other of the sensors is disposed adjacent the bottom of the liquid storage reservoir;
    a pump positioned downstream from the liquid storage reservoir and connected to the liquid storage reservoir by a second conduit, the pump configured to dispense water received from the liquid storage reservoir;
    a valve configured to control water dispensed from the pump;
    at least one spray assembly connected to the valve by a respective spray conduit, the at least one spray assembly configured for positioning in front a respective tire;
    a vehicle tire temperature sensor; and
    a control unit, the control unit being in communication with the pair of water level sensors, the pump, the tire temperature sensor, and the valve, wherein the control unit is configured to:
        i) direct water to the front tires of the vehicle and block water from flowing to the rear tires when the sensor disposed adjacent the bottom of the liquid storage reservoir senses the water level is below a predetermined level;
        ii) determine a vehicle tire temperature of one or more vehicle tires;
        iii) select one or more tires for cooling based on a determination of vehicle tire temperature and water level in the liquid storage reservoir; and
        iv) initiate a liquid discharge from the at least one selected spray assembly.

2. The system of claim 1, further comprising a filter for filtering the condensate to provide a filtered condensate.

3. The system of claim 1, wherein the at least one spray assembly comprises four spray assemblies.

4. The system of claim 1, wherein the at least one spray assembly comprises at least one nozzle attached to a manifold.

5. The system of claim 1, wherein the at least one spray assembly comprises a plurality of nozzles attached to a manifold, each nozzle including an outlet having a first diameter and an inlet having a second diameter, the first diameter being smaller than the second diameter.

6. The system of claim 1, wherein the liquid storage reservoir comprises two inlets and one outlet.

7. A method for cooling tires using a sustainable and integrated system, comprising the steps of:
    providing a sustainable and integrated system for cooling tires, the system including:
        a collecting pan for collecting condensate from an evaporator of a vehicle;
        a liquid storage reservoir connected to the collecting pan by a first conduit;
        a pair of water level sensors disposed within the liquid storage reservoir, wherein one sensor is adjacent the top of the liquid storage reservoir and the other of the sensors is disposed adjacent the bottom of the liquid storage reservoir;

a pump positioned downstream from the liquid storage reservoir and connected to the liquid storage reservoir by a second conduit, the pump configured to dispense water received from the liquid storage reservoir;

a valve configured to control water dispensed from the pump;

at least one spray assembly connected to the valve by a respective spray conduit, the at least one spray assembly configured for positioning in front a respective tire;

a vehicle tire temperature sensor; and a control unit, the control unit being in communication with one or more the pair of water level sensors, the pump, the tire temperature sensor, and the valve, wherein the control unit is configured to:
  i) direct water to the front tires of the vehicle and block water from flowing to the rear tires when the sensor disposed adjacent the bottom of the liquid storage reservoir senses the water level is below a predetermined level;
  ii) determine a vehicle tire temperature of one or more vehicle tires;
  iii) select one or more tires for cooling based on a determination of vehicle tire temperature and water level in the liquid storage reservoir; and
  iv) initiate a liquid discharge from the at least one selected spray assembly;

collecting liquid from the evaporator of the vehicle into the liquid storage reservoir;

monitoring a water level in the liquid storage reservoir using the pair of water level sensors;

selecting one or more of the spray assemblies through which to dispense the liquid collected in the liquid storage reservoir based on the water level in the liquid storage reservoir;

transferring the liquid from the liquid storage reservoir to the at least one spray assembly;

monitoring a temperature of each vehicle tire using the vehicle tire sensor;

selecting the at least one spray assembly through which to dispense the liquid collected in the liquid storage reservoir based on the water level in the liquid storage reservoir and the temperature sensed of each vehicle tire; and directing and dispensing water to one or more front tires and blocking the flow of water to one or more of the rear tires if the water level in the liquid storage reservoir is sensed as being below a predetermined level.

8. The method of cooling tires of claim 7, wherein the water is dispensed toward a ground contact point of each vehicle tire.

* * * * *